Figure 1:
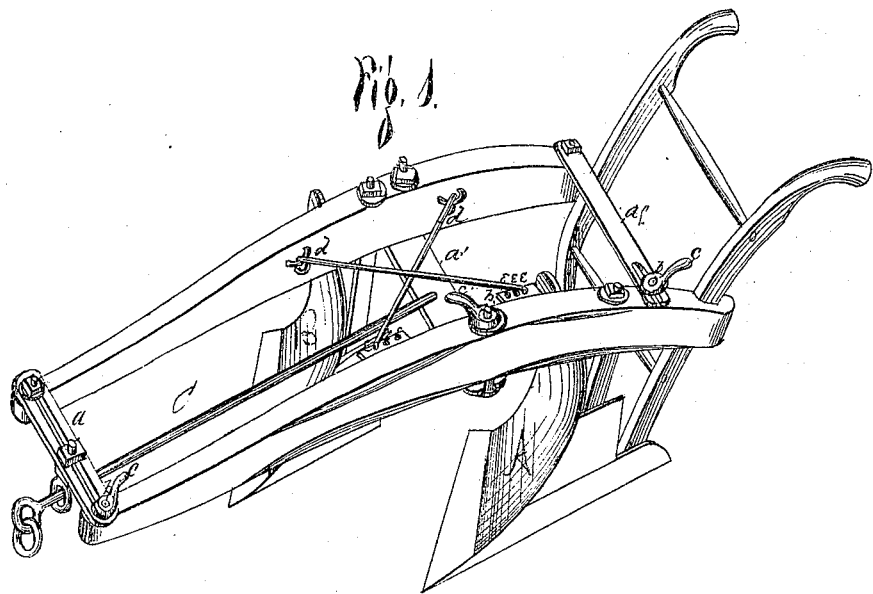

2 Sheets, Sheet 1.

C. M. Gordon,

Plow.

No. 107,481.  Patented Sep. 20, 1870.

Witnesses.  Inventor.
Geo. C. Woolley  C. M. Gordon
Edward McCarlin  p his atty J. C. Perris

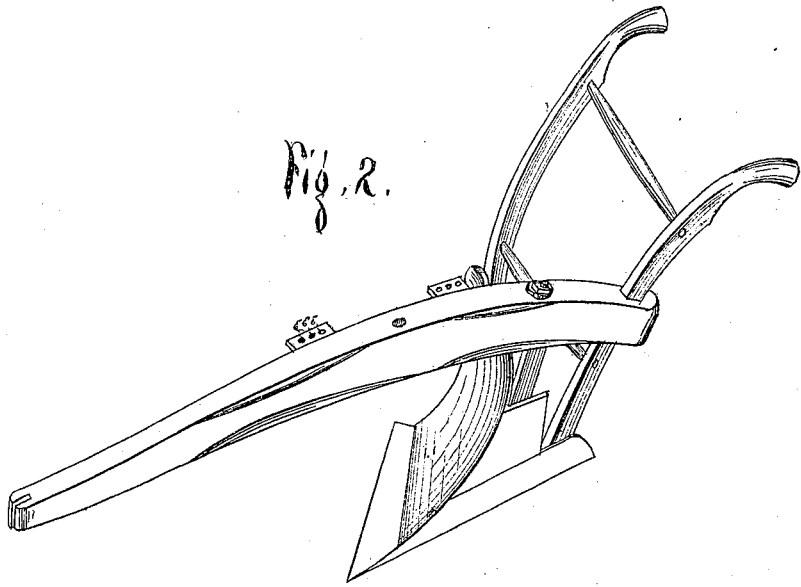

UNITED STATES PATENT OFFICE.

CHARLES M. GORDON, OF LA PORTE, INDIANA.

IMPROVEMENT IN PLOWS.

Specification forming part of Letters Patent No. 107,481, dated September 20, 1870.

*To all whom it may concern:*

Be it known that I, CHARLES M. GORDON, of La Porte, county of La Porte, State of Indiana, have invented certain Improvements in Plows, of which the following is a specification.

My invention relates to the constructing, combining, and arranging the plow, that I may have a double or a single plow, as desired, which is shown in the accompanying drawings, to which reference is made, forming part of this specification.

Similar letters indicate like parts.

Figure 1 represents the combined plow. Fig. 2 represents a single plow.

A and B represent the plows, with both the plow-handles attached to A.

C represents the draft-rod.

$a$ $a'$ $a''$ represent the cross-bars connecting the two plow-beams, and are held in place by the pins $b$ $b$ $b$ and arms $c$ $c$ $c$, as well as by the rods $d$ $d$, which serve to prevent the plow from swaying to and fro, and can be adjusted in the holes $e$ $e$ $e$, in case of contracting or widening the plow.

The tongue or draft-rod C, to which the animals are attached, is secured to the middle cross-bar, $a'$, and, as will be seen, is adjustable and plays in slotted cross-bars $a''$.

To form a single plow from the double one, I detach one beam from the other beam by unscrewing the arms $c$ $c$ $c$, which loosens the pins $b$ $b$ $b$, and removing the rods $d$ $d$ from their holes $e$.

What I claim as my invention, and desire to secure by Letters Patent, is—

The arrangement of the plows A B, having both handles attached to plow-beam A, coupling-bars $a$ $a'$ $a''$, adjustable brace-rods $d$ $d$, and draft-rod C, all combined and arranged substantially as herein shown and described.

La Porte, May 12, 1870.

CHARLES M. GORDON.

Witnesses:
    ROBT. A. HEWS,
    MORTIMER NYE.